(12) United States Patent
Downey et al.

(10) Patent No.: US 8,576,962 B1
(45) Date of Patent: Nov. 5, 2013

(54) DETERMINING CROSS-POLARIZATION ISOLATION USING A MODULATED CARRIER

(75) Inventors: Michael L. Downey, Livermore, CA (US); Jeffrey C. Chu, Los Altos, CA (US)

(73) Assignee: Glowlink Communications Technology, Inc., Los Altos, CA (US)

( * ) Notice: Subject to any disclaimer, the term of this patent is extended or adjusted under 35 U.S.C. 154(b) by 824 days.

(21) Appl. No.: 12/776,073

(22) Filed: May 7, 2010

Related U.S. Application Data (60) Provisional application No. 61/320,241, filed on Apr. 1, 2010.

(51) Int. Cl.
*H03D 1/00* (2006.01)
(52) U.S. Cl.
USPC ........... 375/343; 375/136; 375/147; 375/148; 375/260; 375/262; 375/265; 375/267; 375/340
(58) Field of Classification Search
USPC ......... 375/343, 136, 147, 148, 260, 262, 265, 375/267, 340; 370/320, 335, 342, 441, 479, 370/515; 708/300, 422, 813, 819
See application file for complete search history.

(56) References Cited

U.S. PATENT DOCUMENTS

| | | | | |
|---|---|---|---|---|
| 4,577,330 A | * | 3/1986 | Kavehrad | ...................... 375/235 |
| 2009/0088082 A1 | * | 4/2009 | Sigmund | .................... 455/67.11 |

OTHER PUBLICATIONS

Jyri Hamalainen and Risto Wichman, "On correlations between Dual-polarized Base station Antennas"; GLOBECOM 2003 IEEE.*

* cited by examiner

*Primary Examiner* — Dhaval Patel
(74) *Attorney, Agent, or Firm* — Westberg Law Offices (57) ABSTRACT

A method of and system for determining cross-polarization isolation is described. In one embodiment, a modulated signal is obtained from a communication link. The modulated signal includes a modulated co-polarized signal component and a modulated cross-polarized signal component. Cross-polarization isolation is determined using the modulated co-polarized signal component and the modulated cross-polarized signal component. The determined cross-polarization isolation can be used to adjust an antenna.

41 Claims, 4 Drawing Sheets

DETERMINING CROSS-POLARIZATION ISOLATION USING A MODULATED CARRIER

This application claims the benefit of U.S. Provisional Application No. 61/320,241, filed Apr. 1, 2010, the entire contents of which are hereby incorporated by reference.

FIELD OF THE INVENTION

The invention relates to determining cross-polarization isolation in a communication system.

BACKGROUND

Communication systems and specifically satellite communication systems use orthogonal linear polarizations to increase the transmission capacity of the communications channel. Conventional systems which employ such polarizations require lengthy and restrictive line-up procedures to ensure that the transmit and receive polarizations are properly aligned. If the polarizations are not properly aligned, a significant amount of undesired power (or "bleed through") may be introduced on the orthogonal polarization, which may cause severe interference to communication signals on the orthogonal polarization, affecting the quality of these signals. For this reason, various line-up procedures have been developed to correctly tune the polarization alignment. Typically, these alignment procedures try to line-up a transmitting antenna polarization with the satellite's receive antenna polarization as well as a ground receiving antenna with the satellite's transmit antenna polarization.

Polarization line-up procedures involve measuring the power difference between a signal with the co-polarization (which is the correct polarization) and that due to cross-polarization "bleed-through". During this procedure, the polarization is adjusted until the power difference between the two polarizations is at a maximum. This difference is technically referred to as the "cross-polarization isolation". A typically acceptable value for cross-polarization isolation is 30-35 dB.

Traditionally, polarization isolation measurements are made using a continuous wave (CW) signal, because this kind of signal can be transmitted with a very high power density. This high power density allows the direct measurement of the CW signal on the co- and cross-polarizations. This measurement technique has a limitation in that it requires that the carrier be taken out of service and placed into CW mode in order to determine the cross-polarization isolation.

SUMMARY

A method of and system for determining cross-polarization isolation is described. In one embodiment, a modulated signal is obtained from a communication link. The modulated signal includes a modulated co-polarized signal component and a modulated cross-polarized signal component. Cross-polarization isolation is determined using the modulated co-polarized signal component and the modulated cross-polarized signal component. The determined cross-polarization isolation can be used to adjust an antenna.

In another embodiment, a signal is received which includes a co-polarized signal component and a cross-polarized signal component. A vector of digital sample values obtained from the co-polarized signal component is cross correlated with a vector of digital sample values obtained from the cross-polarized signal component. A first cross-polarization isolation is determined using results of the cross correlating. A power spectral density is determined for each of the co-polarized signal component and the cross-polarized signal component. A second cross-polarization isolation is determined from a difference between the power spectral density of the co-polarized signal component and the power spectral density of the cross-polarized signal component. A maximum of the first cross-polarization isolation and the second cross-polarization isolation is output.

DESCRIPTION OF AN EMBODIMENT OF THE INVENTION

The present invention is directed toward determining cross-polarization isolation from either a modulated communications carrier signal or a CW. Unlike methods that are restricted to the use of a CW signal, using the modulated carrier as a basis for measurement does not require that the communication carrier be taken out of service in order to determine the cross-polarization isolation. This saves time as the signal does not have to be switched back and forth between CW and modulated mode. It also removes the restriction of only using a CW signal. Furthermore, the cross-polarization isolation can be more frequently verified or even continuously verified.

We describe a system and method for measuring and verifying cross-polarization isolation from measurements taken only from a received signal where the received signal can be a modulated communications carrier.

Cross-polarization isolation is defined as shown in equation 1.

$$I = P_{co\text{-}pol} - P_{x\text{-}pol} \quad \text{(equation 1)}$$

Where,

I represents the cross-polarization isolation, $P_{co\text{-}pol}$ represents the power of the signal on co-polarization, and $P_{x\text{-}pol}$ represents the power of the signal bleed-though on the cross-polarization.

As mentioned above, existing methods for measuring the isolation require the transmitting terminal to transmit a CW signal. This type of signal can be transmitted using a very high power density and allows the primary and cross-polarized signal energy to be directly measured using a spectrum analyzer type device. Signal energy of both the primary and cross-polarized signal components can be directly measured because the power density of the CW is higher than the noise floor of the receiving system. The isolation can be determined as the power difference between the co-polarized and cross-polarized signal components.

Figure 1:
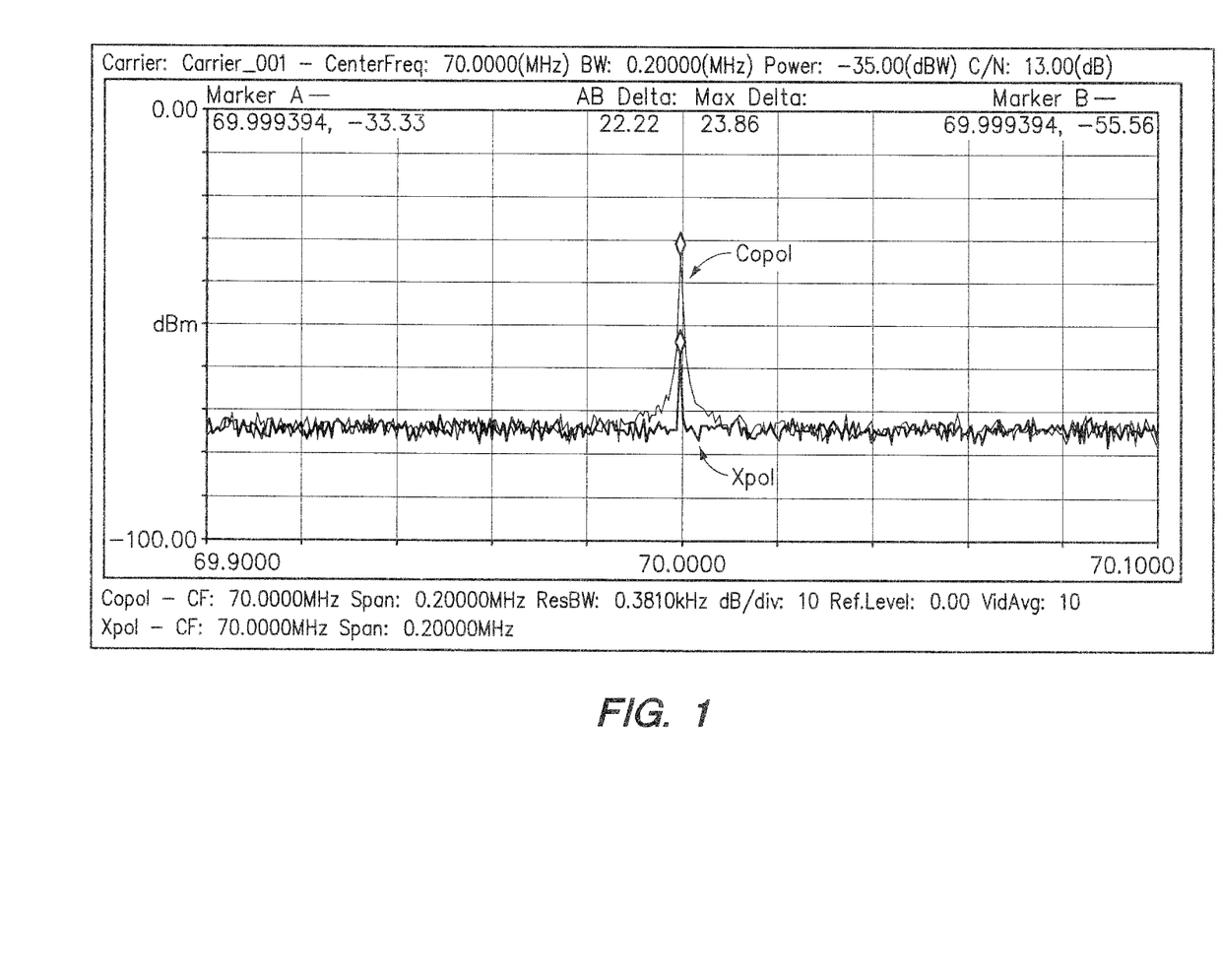
FIG. 1 illustrates a spectrum analyzer display of co-polarized and cross-polarized signal components for a communication modem transmitting in CW mode in accordance with an embodiment of the present invention.
Figure 2:
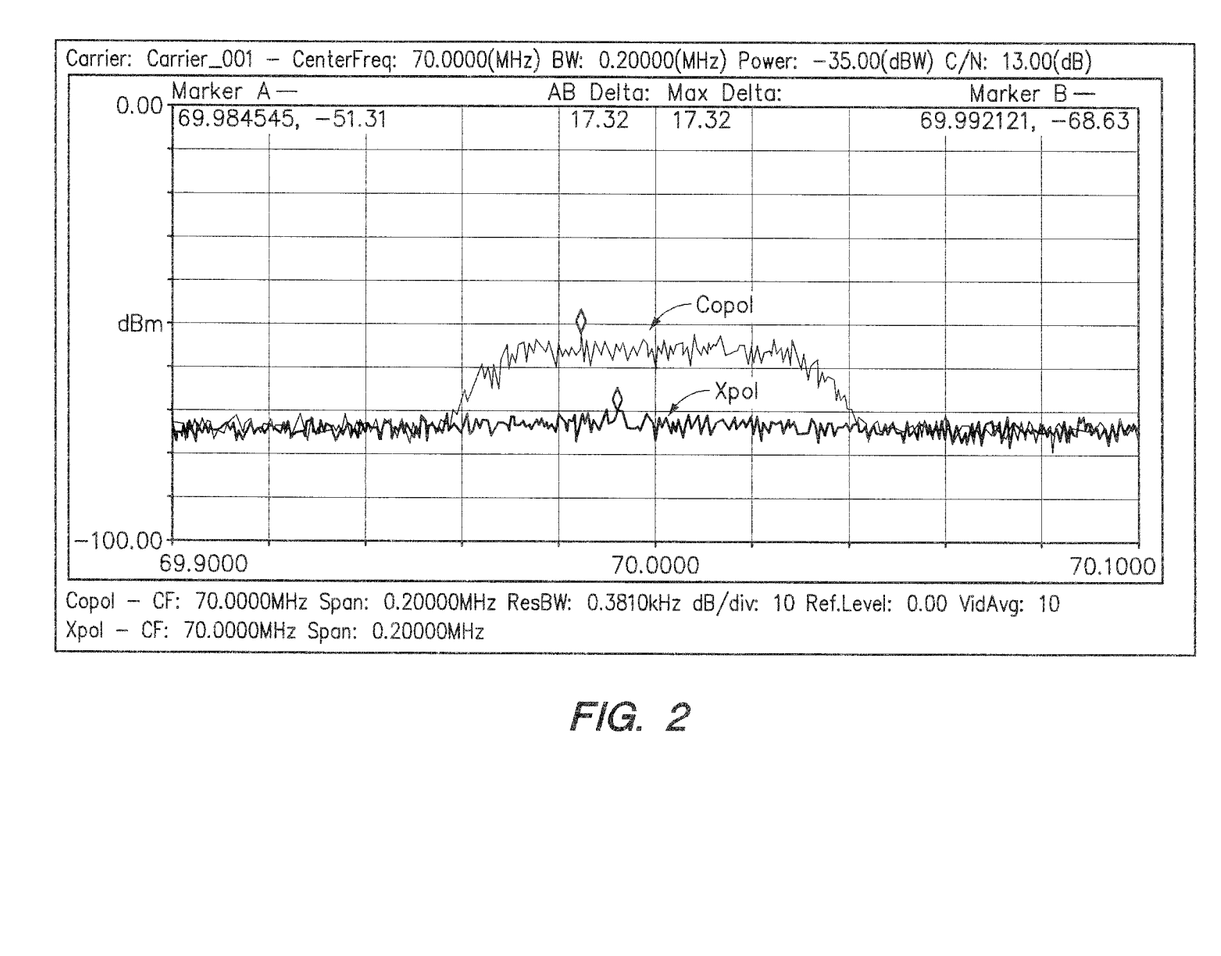
FIG. 2 illustrates a spectrum analyzer display of co-polarized and cross-polarized signal components for a communication modem transmitting with modulation on in accordance with an embodiment of the present invention.

To illustrate the challenge of using a modulated carrier to measure the isolation, consider FIGS. 1 and 2 below. FIG. 1 shows a scenario where a communication modem is transmitting in CW mode at the link's required power. FIG. 1 shows a spectrum analyzer display of both the co-polarized and cross-polarized components of this transmitted signal. As discussed previously, it is relatively easy to measure the cross-polarization isolation when the signal is transmitted in CW mode, because the peak power density is very high and therefore visible on both polarizations. However, consider FIG. 2, which shows this same signal with the modulation turned on. It is important to note that the total power of the modulated signal shown in FIG. 2 is identical to the CW signal shown in FIG. 1. When the signal becomes modulated, the power spreads out over the bandwidth of the modulated signal, which dramatically reduces the peak power density. From FIG. 2, it is evident that it is no longer possible to easily measure the isolation. This is because the cross-polarized signal component now has a power density that is lower than the noise density and is therefore no longer visible or easily measurable.

From FIG. 2, it is clear that a spectral analyzer approach cannot be reliably used to measure the cross-polarization isolation when the carrier is modulated. To overcome this, we disclose a new method that allows measuring the cross-polarization isolation whether the carrier is transmitted as a CW or fully modulated.

In accordance with an embodiment of the present invention, the co-polarized and cross-polarized versions of the signal are acquired and processed so that the isolation can be measured even when the signal is modulated. With this technique the power of the cross-polarized component can be near or below the noise power. Instead of relying solely on frequency domain measurement techniques, a combination of both time and frequency domain processing techniques are employed to measure the isolation. A cross correlation function is employed to determine cross correlation between the co-polarized and cross-polarized signal components that are coherently acquired. The cross correlation function is a mathematical function which measures the similarity between two signal components by applying the mathematical function to the two signal components.

Figure 3:
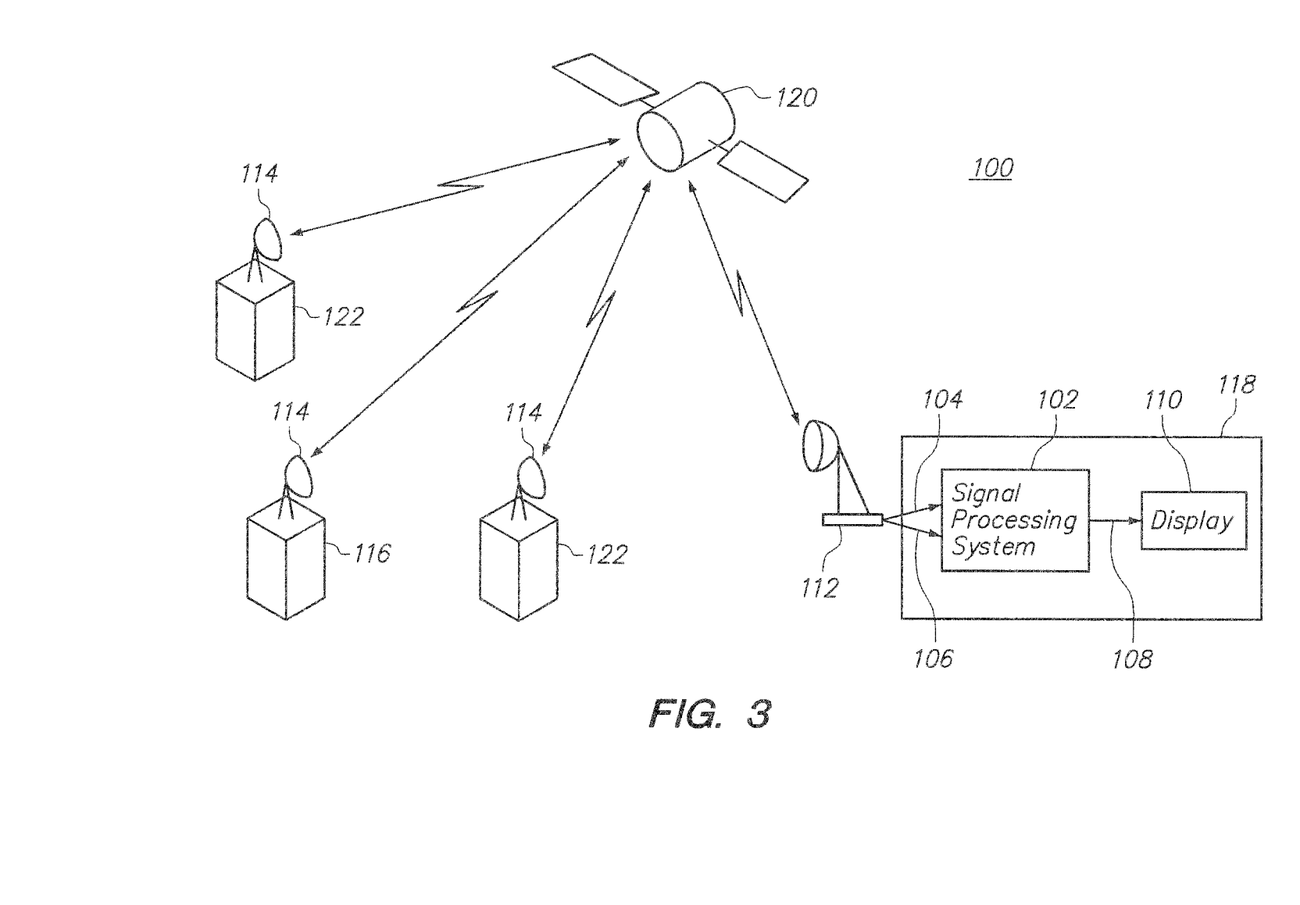
FIG. 3 illustrates a communication system in which cross-polarization isolation can be determined in accordance with an embodiment of the present invention.

FIG. 3 illustrates communication system 100 in which cross-polarization isolation can be measured and adjusted in accordance with an embodiment of the present invention. The communication system 100 includes a signal processing system 102 which receives as input a co-polarized signal component 104 and a cross-polarized signal component 106 of a received signal. The system 102 of FIG. 3 produces as output 108 a measure of the cross-polarization isolation between the co-polarized and cross-polarized signal components of a received signal. Cross-polarization isolation measurements produced by the system 102 may then be displayed by a display 110. The cross-polarization isolation measurements may be saved for future use.

The co-polarized and cross-polarized signals components 104, 106 may be received from a communication link via a receive antenna 112 having two output feeds, one for each of the co-polarized and cross-polarized signal components. The physical orientation of the receive elements of antenna 112 can then be adjusted while the cross-polarization isolation is being measured and viewed on the display 110. The antenna 112 can be manipulated by hand or by motors attached to the antenna 112. The antenna is adjusted so that the measured cross-polarization isolation is maximized. This results in minimization of cross-polarization interference. A key advantage of the present invention is that the adjustment of the antenna 112 and monitoring of the resulting cross-polarization isolation can be performed without taking the communication link out of service. Another key advantage is that the cross-polarization isolation can be measured using any modulated carrier having the same polarity as the receiving antenna.

The techniques of the present invention can also be used to measure and adjust transmit isolation. For measuring transmit isolation, the system 102 is also connected to receive the co-polarized and cross-polarized signal components from a receive antenna (e.g. the antenna 112 in FIG. 3). In this case, the receive antenna may have already been aligned to achieve the desired cross-polarization isolation. As shown in FIG. 3, additional antennas 114 may transmit signals to the antenna 112 via communication links through a satellite 120. To adjust the transmit isolation of any of the antennas 114, the orientation of transmit elements of the particular antenna 114 can be adjusted while the cross-polarization isolation is being monitored by the system 102 so that the cross-polarization isolation is maximized.

As a particular example, the transmit antenna 114 may be part of a two-way VSAT antenna located at a business location 116, such as a gas station, and may be used to communicate business related data, such as credit card transactions, to a central processing facility 118. A communication signal from the antenna 114 may be transmitted to the satellite 120 which then passes the signal to a VSAT hub positioned at the central facility 118. Additional such antennas 114 may be positioned at businesses 122 in a variety of locations, all of which transmit various credit card transactions to the same central facility 118. The central facility 118 can be located many miles away from the businesses 122. The system 102 can positioned at the central facility 118 and the antenna 112 can be included in the receive antenna of the VSAT hub. To adjust the transmit isolation of any of the transmit antennas 114, the cross-polarization isolation can be monitored at the central facility 118 while the orientation of the particular transmit antenna 114 can be adjusted so that the cross-polarization isolation is maximized.

In this example, because the cross-polarization isolation measurement can be performed without taking the corresponding communication link out of service, the measurement can be performed without interrupting the ability of the business to continue processing credit card transactions. This allows verification of antenna alignment to be performed more easily and frequently. Verification of antenna alignment can even be performed continuously if desired. Additionally, should an antenna 114 be found to be out of alignment, it can be adjusted to maximize the cross-polarization isolation without taking the corresponding communication link out of service. Therefore, in this example, the business can continue processing credit card transactions even while the antenna is adjusted. The invention has significant advantages over prior techniques which require such an interruption, particularly considering that an antenna which was previously aligned can become mis-aligned for a variety of reasons, such as wind gusts, vibrations or settlement of the structure to which the antenna is attached, and inadvertent bumping from personnel working on the structure.

To measure receive isolation in this example, the satellite 120 may be configured to transmit a pilot signal which is picked up by the receive antenna 112. The cross-polarization isolation determined by the system 102 is indicative of the orientation of the receive antenna 112. To adjust the receive isolation, the orientation of the antenna 112 can be manipulated while the cross-polarization isolation is being monitored and so that the cross-polarization isolation is maximized.

Figure 4:
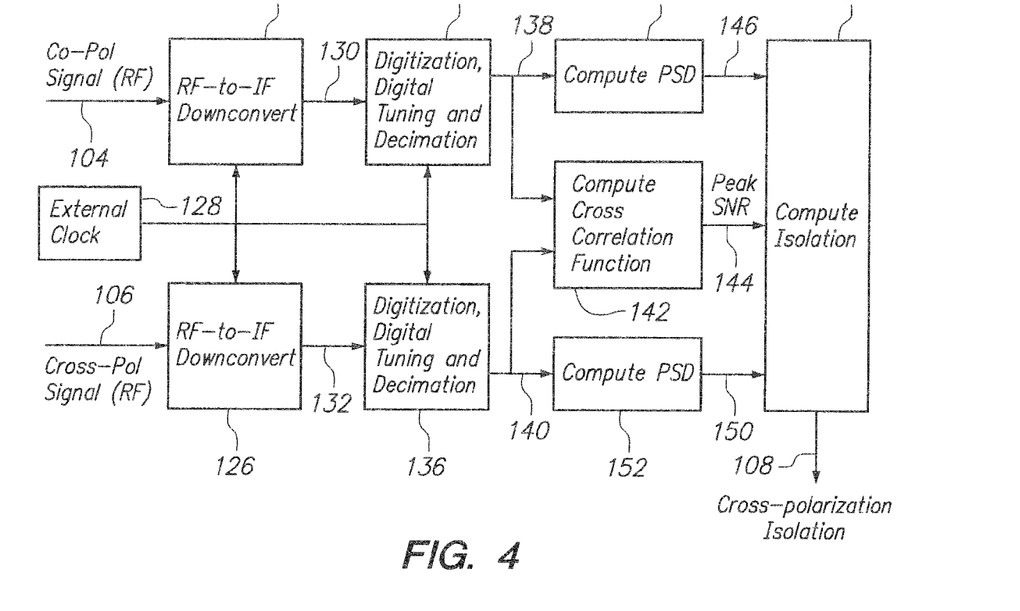
FIG. 4 illustrates a block diagram of a signal processing system for determining cross-polarization isolation in accordance with an embodiment of the present invention.

FIG. 4 illustrates the signal processing system 102 in accordance with an embodiment of the present invention. As shown in FIG. 4, the system 102 receives as input the co-polarized and cross-polarized signal components 104, 106 of a received signal. The system 102 produces as output 108 a measure of the cross-polarization isolation between the co-polarized and cross-polarized signal components of the received signal.

As shown in FIG. 4, the co-polarized and cross-polarized signal components 104, 106 are down-converted from the receive radio frequency (RF) frequency to an intermediate frequency (IF) frequency. This may be accomplished by RF-to-IF converters 124, 126. As shown in FIG. 3, the RF-to-IF converters 124, 126 preferably use a common reference clock, which is obtained from a common clock source 128. At the output of the RF-to-IF converters 124, 126 are co-polarized and cross-polarized IF signals, 130 and 132, respectively. The co-polarized and cross-polarized IF signals 130, 132 are then coherently digitized by digitizers 134, 136. As shown in FIG. 4, the digitizers 134, 136 also preferably use the common reference clock from source 128. The digitization process performed by the digitizers 134, 136 may include filtering, which band limits the signals, digital sampling, and then digital tuning and decimation to form baseband in-phase and quadrature (I and Q) sample vectors 138, 140, respectively, on both IF signals.

The sample vector 138 for the co-polarized signal component and the sample vector 140 for the cross-polarized signal component are cross correlated. Cross correlation may be performed by a cross correlator 142. The cross correlator 142 computes a cross correlation vector from the samples of the co-polarized and cross-polarized signal components. The cross correlator 142 may also determine a peak signal-to-noise ratio (SNR) from the cross correlation vector so that the output 144 of the cross correlator 142 is representative of the peak SNR.

Prior to the cross correlation, one of the signals may be adjusted in frequency to compensate for potential local oscillator (LO) differences on the co-polarized and cross-polarized signals. It is common in satellite communication systems for orthogonal signal paths to use distinct and separate local oscillators, which may be slightly offset from one another. This offset compensation may be performed by one or both of the digitizers 134, 136 or by the cross correlator 142.

The cross correlation may be performed using a known cross correlation function that obtains a cross correlation between two vector inputs. Cross correlation is essentially a measure of the similarity of the two vectors as a function of a time delay applied to one of them.

As an example, the cross correlation function can be given as:

$$R_{Cpol,Xpol}[n_0,n_1] = [E\{Cpol(n_0)Xpol^*(n_1)\}] \quad \text{(equation 2)}$$

Where $Cpol(n_0)$ represents the sample vector 138 of the co-polarization component and $Xpol(n_1)$ represents the for sample vector 140 of the cross-polarization component. Thus, $Xpol^*(n_1)$ represents the complex conjugate of the vector $Xpol(n_1)$. $E\{f\}$ represents the expectation of the function $f$. Therefore, $R_{Cpol,Xpol}[n_0,n_1]$ represents the cross correlation of the vector $Cpol(n_0)$ and the complex conjugate of the vector $Xpol(n_1)$. This output is referred to here as the cross correlation vector.

As discussed above, there can be potential differences in the satellite LO frequencies. To compensate for any potential differences in the satellite LO frequencies, the X-pol function or the Cpol function may be frequency shifted prior to the cross correlation. This may be accomplished by manipulating the sample values of cross-polarization component or the co-polarization component using a frequency shift theorem for Fourier transforms or some other frequency shifting technique.

As described above, one of the signals may be adjusted in frequency prior to the cross correlation to compensate for the potential differences in the satellite LO frequencies. Alternatively, a frequency shift compensation may be incorporated into the correlation function. For example, a cross ambiguity function which incorporates such a frequency shift could be employed.

The peak SNR can be determined from results of the cross correlation function. This may be accomplished by identifying a peak value in the cross correlation vector. This peak value represents maximum correlation. Additionally, an average of values from the cross correlation vector may be determined to represent noise. The peak value is preferably excluded from the samples from which the average is computed. The peak signal-to-noise ratio (SNR) can then be obtained as a ratio of the peak value to the average value. Thus, the peak SNR is obtained by comparing the correlation maximum to the average noise level in the correlation vector, with the peak value excluded from the computation to obtain the average.

Additionally, the power spectral density (PSD) of each signal component is computed using the sample vectors 138, 140. A power spectral density 146 of the co-polarized signal component 104 may be computed from the sample vector 138 by PSD computation block 148, while a power spectral density 150 of the cross-polarized signal component 106 may be computed from the sample vector 140 by PSD computation block 152.

The cross-polarization isolation may then be computed. This may be accomplished by a cross-polarization isolation computation block 150.

Figure 5:
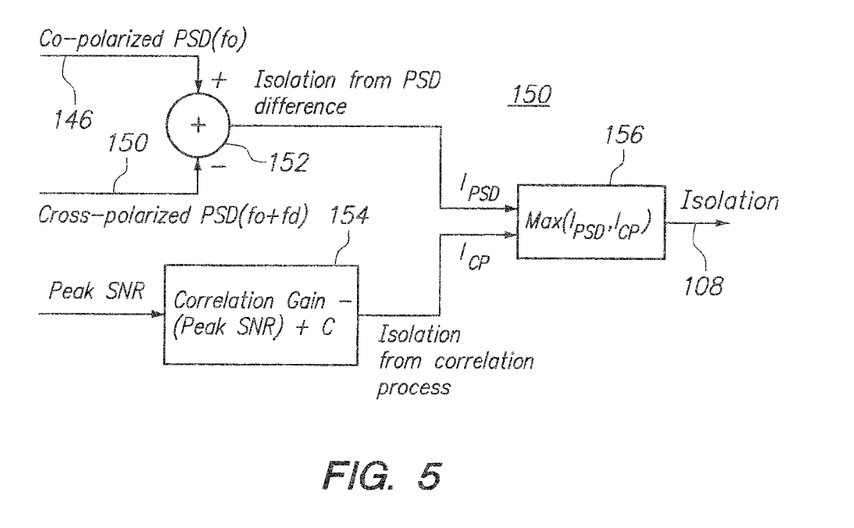
FIG. 5 illustrates a block diagram showing computation of cross-polarization isolation in accordance with an embodiment of the present invention.

FIG. 5 illustrates a process which may be performed by cross-polarization isolation computation block 150 in accordance with an embodiment of the present invention. As shown in FIG. 5, a summation block 152 receives the power spectral density 146 of the co-polarized signal component and the power spectral density 150 of the cross-polarized signal component and computes a difference between them. Thus, the summation block 150 produces a difference $I_{PSD}$ in power spectral density between the co-polarized and cross-polarized signal components. If the received signal is a CW signal, then this difference $I_{PSD}$ represents the cross-polarization isolation between the inputs. However, if the received signal is modulated, then the cross-polarization isolation can be computed as described below.

In this document and as shown in FIG. 5, the term fo represents the peak frequency of the co-polarized component and fo+fd represents the peak frequency of the cross-polarized component. Additionally, the term fd represents a shift in frequency that may be present due oscillator differences on the satellite. Typically, fd will be in the range between 0 and 1000 Hz, however it can be larger especially on older satellites.

As shown in FIG. 5, the peak SNR may be used to determine a cross-polarization isolation $I_{CP}$. This isolation is determined from results of the cross correlation process. More specifically, a correlation gain may be determined based on the number of samples of the signals 138, 140 used to determine the cross correlation and, thus, the peak SNR. The peak SNR may be subtracted from the correlation gain. Additionally, a calibration factor may be added to the result to compensation for processing loss in computing the cross correlation.

Specifically, cross-polarization isolation $I_{CP}$ may be given as:

$$I_{CP} = \text{Correlation Gain} - \text{Peak } SNR + C \quad \text{(equation 3)}$$

Where the Correlation Gain is defined as $10*\log_{10}$(number of samples), the peak SNR is the correlation maximum compared to the average noise level in the correlation function, and C is a calibration factor to compensate for the processing loss in the correlation function. The cross-polarization isolation $I_{CP}$ may be computed by computation block 154 of FIG. 5.

Referring to FIG. 5, the cross-polarization isolation $I_{CP}$ and the difference isolation $I_{PSD}$ computed from the power spectral density difference may be applied to a comparison block 156 which passes the greater of the two values, $I_{PSD}$ and $I_{CP}$ to its output. This output is representative of the cross-polarization isolation.

Thus, the cross-polarization isolation may be given as:

$$\text{Isolation} = \text{Max}(I_{PSD}, I_{CP}) \quad \text{(equation 4)}$$

Where
$I_{PSD}$=is the isolation computed from the power spectral density difference
$I_{CP}$=the isolation computed using the cross correlation process
$I_{PSD}$ can be obtained using equation 1 and $I_{CP}$ can be obtained using equation 3.

As discussed above, if the received signal is a CW signal, then this difference isolation $I_{PSD}$ represents the cross-polarization isolation between the inputs. Therefore, in this case, the difference $I_{PSD}$ can be taken as the cross-polarization isolation measurement. However, if the received signal is modulated, then the difference $I_{PSD}$ cannot be expected to provide a reliable measurement of isolation. Rather, in this case, the cross-polarization isolation $I_{CP}$ can be expected to provide a reliable result. Thus, where the received signal is modulated, the isolation $I_{CP}$ can be taken as the cross-polarization isolation. Accordingly, the comparison block 156 can be omitted or replaced with some other device such as a switch or multiplexer. Additionally, if only modulated signals are to be used as input, certain additional elements can be omitted, which may include PSD computation blocks 148, 152, summation block 152 and comparison block 156.

For modulated signals it has been found that the obtained difference isolation $I_{PSD}$ is linear for lower isolations and then flattens out as the isolation increases. This flattening occurs because the cross-polarized signal energy becomes lower than the received noise. Additionally, the cross-polarization isolation $I_{CP}$ tends to be somewhat flat at lower isolations and then becomes relatively linear as the isolation increases. Therefore, taking the maximum of the two values $I_{PSD}$ and $I_{CP}$ as the isolation measurement tends to provide an accurate representation of the isolation throughout the range of possible values. Additionally, this obtaining the maximum of the two values $I_{PSD}$ and $I_{CP}$ accommodates both CW signals and modulated signals.

Therefore, we have disclosed a new method for measuring cross-polarization isolation that can use either a modulated carrier or CW. This new method has significant advantages over existing methods. This new method is significantly faster and does not require an interruption to the communication service when the cross-polarization isolation needs to be re-verified. In addition, the disclosed method works equally well whether the signal is placed in modulated or the traditional CW mode.

The description above illustrates operation of embodiments of the invention and is not meant to limit the scope of the invention. It will be apparent to one skilled in the relevant art that variations will be encompassed by the spirit and scope of the invention and that the invention may be practiced in other embodiments. The system described herein may be implemented via a combination of hardware and software or entirely in hardware elements. While received signals are being processed as described herein, at least portions or components of the signals that are being actively processed may be at least temporarily stored in hardware circuitry that performs the signal processing steps or in other storage media. Also, the particular division of functionality between the various system components described herein is merely exemplary. Thus, the methods and operations presented herein are not inherently related to any particular computer or other apparatus. Functions performed by a single system component may instead be performed by multiple components, and functions performed by multiple components may instead performed by a single component. It will also be apparent that process steps described herein can be embodied in software, firmware or hardware. Thus, the present invention or portions thereof may be implemented by apparatus for performing the operations herein. This apparatus may be specially constructed or configured, such as application specific integrated circuits (ASICs) or Field Programmable Gate Anays (FPGAs), as a part of an ASIC, as a part of FPGA, or it may comprise a general-purpose computer selectively activated or reconfigured by a computer program stored on a computer readable medium that can be accessed and executed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and or coupled to a computer system bus. Furthermore, the methods described in the specification may be implemented by a single processor or be implemented in architectures employing multiple processor designs for increased computing capability. Accordingly, the disclosure of the present invention is intended to be illustrative, but not limiting, of the scope of the invention.

The invention claimed is:

1. A method of determining cross-polarization isolation, comprising:
    obtaining a modulated signal from a communication link, the modulated signal including a modulated co-polarized signal component and a modulated cross-polarized signal component;
    determining cross-polarization isolation using the modulated co-polarized signal component and the modulated cross-polarized signal component, wherein said determining the cross-polarization isolation comprises:
        cross correlating a vector of digital sample values obtained from the modulated co-polarized signal component with a vector of digital sample values obtained from the modulated cross-polarized signal component wherein results of the cross correlating comprise a cross-correlation vector;
        obtaining a ratio of a peak value from the cross-correlation vector to an average of values from the cross-correlation vector, the ratio representing a peak signal-to-noise ratio;

determining a correlation gain from a number of digital sample values used to perform the cross correlating; and determining a difference between the correlation gain and the peak signal-to-noise ratio; and using the determined cross-polarization isolation to adjust an antenna.

2. The method according to claim 1, wherein the antenna is connected to the communication link as a receive antenna, a transmit antenna or both.

3. The method according to claim 1, wherein said determining the cross-polarization isolation further comprises adding a calibration factor to the difference between the correlation gain and the peak signal-to-noise ratio.

4. The method according to claim 3, further comprising:
determining a power spectral density for each of the modulated co-polarized signal component and the modulated cross-polarized signal component;

determining a difference between the power spectral density of the modulated co-polarized signal component and the power spectral density of the modulated cross-polarized signal component.

5. The method according to claim 4, wherein said using the determined cross-polarization isolation to adjust the antenna comprises obtaining a maximum of the cross-polarization isolation and the difference in power spectral densities as an output and adjusting the antenna so as to maximize the output.

6. A method of determining cross-polarization isolation, comprising:
obtaining a signal from a communication link, the signal including a co-polarized signal component and a cross-polarized signal component;

cross correlating a vector of digital sample values obtained from the co-polarized signal component with a vector of digital sample values obtained from the cross-polarized signal component wherein the results of the cross correlating comprise a cross-correlation vector;

determining cross-polarization isolation using results of the cross correlating to obtain a peak signal-to-noise ratio, wherein the peak signal-to-noise ratio is determined by identifying a peak value from the cross-correlation vector, determining an average of values from the cross-correlation vector and obtaining a ratio of the peak value to the average; and using the determined cross-polarization isolation to adjust an antenna.

7. The method according to claim 6, wherein the antenna is connected to the communication link as a receive antenna, a transmit antenna or both.

8. The method according to claim 6, wherein the signal is modulated.

9. The method according to claim 6, further comprising determining a number of digital sample values used to perform the cross correlating and determining a correlation gain from the number of digital sample values.

10. The method according to claim 9, wherein said determining the cross-polarization isolation further comprises determining a difference between the correlation gain and the peak signal-to-noise ratio.

11. The method according to claim 10, wherein said determining the cross-polarization isolation further comprises adding a calibration factor to the difference between the correlation gain and the peak signal-to-noise ratio.

12. The method according to claim 6, further comprising determining a power spectral density for each of the co-polarized signal component and the cross-polarized signal component.

13. The method according to claim 12, wherein the cross-polarization isolation is a first cross-polarization isolation and further comprising determining a second cross-polarization isolation from a difference between the power spectral density of the co-polarized signal component and the power spectral density of the cross-polarized signal component.

14. The method according to claim 13, wherein a maximum of the first cross-polarization isolation and the second cross-polarization isolation is provided as an output.

15. A method of determining cross-polarization isolation, comprising:
obtaining a signal from a communication link, the signal including a co-polarized signal component and a cross-polarized signal component;

cross correlating a vector of digital sample values obtained from the co-polarized signal component with a vector of digital sample values obtained from the cross-polarized signal component;

determining a first cross-polarization isolation using results of the cross correlating;

determining a power spectral density for each of the co-polarized signal component and the cross-polarized signal component;

determining a second cross-polarization isolation from a difference between the power spectral density of the co-polarized signal component and the power spectral density of the cross-polarized signal component; and using a maximum of the first cross-polarization isolation and the second cross-polarization isolation to adjust an antenna.

16. The method according to claim 15, wherein the antenna is connected to the communication link as a receive antenna, a transmit antenna or both.

17. The method according to claim 15, wherein the signal is modulated.

18. The method according to claim 15, wherein the signal is unmodulated.

19. The method according to claim 15, wherein said determining the first cross-polarization isolation comprises using results of the cross correlating to obtain a peak signal-to-noise ratio.

20. The method according to claim 19, wherein the results of the cross correlating comprise a cross-correlation vector and wherein the peak signal-to-noise ratio is determined by identifying a peak value from the cross-correlation vector, determining an average of values from the cross-correlation vector and obtaining a ratio of the peak value to the average.

21. The method according to claim 20, further comprising determining a number of digital sample values used to perform the cross correlating and determining a correlation gain from the number of digital sample values.

22. The method according to claim 21, wherein said determining the first cross-polarization isolation further comprises determining a difference between the correlation gain and the peak signal-to-noise ratio.

23. The method according to claim 22, further comprising adding a calibration factor to the difference between the correlation gain and the peak signal-to-noise ratio.

24. A system for determining cross-polarization isolation, comprising:
means for obtaining a signal from a communication link, the signal including a co-polarized signal component and a cross-polarized signal component;

means for processing the co-polarized signal component to obtain a vector of digital sample values for the co-polarized signal component;

means for processing the cross-polarized signal component to obtain a vector of digital sample values for the cross-polarized signal component;

means for cross correlating the vector for the co-polarized signal component with the vector for the cross-polarized signal component and using results of the cross correlating to obtain a peak signal-to-noise ratio;

means for determining a correlation gain based on a number of digital sample values used to perform the cross correlating; and means for determining cross-polarization isolation based on a difference between the correlation gain and the peak signal-to-noise ratio.

25. The system according to claim 24, further comprising means for using the determined cross-polarization isolation to adjust an antenna, wherein the antenna is connected to the communication link as a receive antenna, a transmit antenna or both.

26. The system according to claim 24, wherein the signal is modulated.

27. The system according to claim 24, further comprising means for determining a difference in a power spectral density of the co-polarized signal component and a power spectral density of the cross-polarized signal component.

28. The system according to claim 27, further comprising means for using a maximum of the difference in power spectral density and the cross-polarization isolation to adjust the antenna.

29. The system according to claim 24, wherein said means for determining cross-polarization isolation subtracts the peak signal-to-noise ratio from the correlation gain and adding a calibration factor.

30. The system according to claim 24, wherein the results of the cross correlating comprise a cross-correlation vector.

31. The system according to claim 30, wherein the peak signal-to-noise ratio is determined by identifying a peak value from the cross-correlation vector, determining an average of values from the cross-correlation vector and obtaining a ratio of the peak value to the average.

32. The system according to claim 31, wherein the peak value is excluded from the values used to determine the average.

33. The system according to claim 24, wherein at least one of the co-polarized signal component and the cross-polarized signal component is adjusted in frequency to compensate for local oscillator differences prior to performing said cross correlating.

34. A system for determining cross-polarization isolation, comprising:

an antenna that receives a modulated signal, the modulated signal including a modulated co-polarized signal component and a modulated cross-polarized signal component; and a signal processor that determines cross-polarization isolation using the modulated co-polarized signal component and the modulated cross-polarized signal component, wherein signal processor determines the cross-polarization isolation by: cross correlating a vector of digital sample values obtained from the modulated co-polarized signal component with a vector of digital sample values obtained from the modulated cross-polarized signal component to obtain a cross-correlation vector; obtaining a ratio of a peak value from the cross-correlation vector to an average of values from the cross-correlation vector, the ratio representing a peak signal-to-noise ratio; determining a correlation gain from a number of digital sample values used to obtain the cross-correlation vector; and determining a difference between the correlation gain and the peak signal-to-noise ratio.

35. A system for determining cross-polarization isolation, comprising:

an antenna that receives a signal, the signal including a co-polarized signal component and a cross-polarized signal component; and a signal processor that cross correlates a vector of digital sample values obtained from the co-polarized signal component with a vector of digital sample values obtained from the cross-polarized signal component to obtain a cross-correlation vector, and that determines cross-polarization isolation using results of the cross correlating to obtain a peak signal-to-noise ratio, wherein the peak signal-to-noise ratio is determined by identifying a peak value from the cross-correlation vector, determining an average of values from the cross-correlation vector and obtaining a ratio of the peak value to the average.

36. A system for determining cross-polarization isolation, comprising:

an antenna that receives a signal, the signal including a co-polarized signal component and a cross-polarized signal component; and a signal processor that: cross correlates a vector of digital sample values obtained from the co-polarized signal component with a vector of digital sample values obtained from the cross-polarized signal component; determines a first cross-polarization isolation using results of the cross correlating; determines a power spectral density for each of the co-polarized signal component and the cross-polarized signal component; determines a second cross-polarization isolation from a difference between the power spectral density of the co-polarized signal component and the power spectral density of the cross-polarized signal component; and that outputs a maximum of the first cross-polarization isolation and the second cross-polarization isolation.

37. A system for determining cross-polarization isolation, comprising:

an antenna that receives a signal, the signal including a co-polarized signal component and a cross-polarized signal component; and a signal processor that: processes the co-polarized signal component to obtain a vector of digital sample values for the co-polarized signal component; processes the cross-polarized signal component to obtain a vector of digital sample values for the cross-polarized signal component; cross correlates the vector for the co-polarized signal component with the vector for the cross-polarized signal component and using results of the cross correlating to obtain a peak signal-to-noise ratio; determines a correlation gain based on a number of digital sample values used to perform the correlating; and determines cross-polarization isolation based on a difference between the correlation gain and the peak signal-to-noise ratio.

38. A non-transitory computer readable medium having stored thereon computer code which, when executed, implements a method of determining cross-polarization isolation, the method comprising:

obtaining a modulated signal, the modulated signal including a modulated co-polarized signal component and a modulated cross-polarized signal component; and determining cross-polarization isolation using the modulated co-polarized signal component and the modulated cross-polarized signal component, wherein said determining the cross-polarization isolation comprises:
cross correlating a vector of digital sample values obtained from the modulated co-polarized signal component with a vector of digital sample values obtained from the modulated cross-polarized signal component wherein results of the cross correlating comprise a cross-correlation vector;
obtaining a ratio of a peak value from the cross-correlation vector to an average of values from the cross-correlation vector, the ratio representing a peak signal-to-noise ratio;
determining a correlation gain from a number of digital sample values used to perform the cross correlating; and
determining a difference between the correlation gain and the peak signal-to-noise ratio.

39. A non-transitory computer readable medium having stored thereon computer code which, when executed, implements a method of determining cross-polarization isolation, the method comprising:
obtaining a signal, the signal including a co-polarized signal component and a cross-polarized signal component;
cross correlating a vector of digital sample values obtained from the co-polarized signal component with a vector of digital sample values obtained from the cross-polarized signal component wherein the results of the cross correlating comprise a cross-correlation vector; and
determining cross-polarization isolation using results of the cross correlating to obtain a peak signal-to-noise ratio, wherein the peak signal-to-noise ratio is determined by identifying a peak value from the cross-correlation vector, determining an average of values from the cross-correlation vector and obtaining a ratio of the peak value to the average.

40. A non-transitory computer readable medium having stored thereon computer code which, when executed, implements a method of determining cross-polarization isolation, the method comprising:
obtaining a signal, the signal including a co-polarized signal component and a cross-polarized signal component;
cross correlating a vector of digital sample values obtained from the co-polarized signal component with a vector of digital sample values obtained from the cross-polarized signal component;
determining a first cross-polarization isolation using results of the cross correlating;
determining a power spectral density for each of the co-polarized signal component and the cross-polarized signal component;
determining a second cross-polarization isolation from a difference between the power spectral density of the co-polarized signal component and the power spectral density of the cross-polarized signal component; and
determining a maximum of the first cross-polarization isolation and the second cross-polarization isolation.

41. A non-transitory computer readable medium having stored thereon computer code which, when executed, implements a method of determining cross-polarization isolation, the method comprising:
obtaining a signal, the signal including a co-polarized signal component and a cross-polarized signal component;
processing the co-polarized signal component to obtain a vector of digital sample values for the co-polarized signal component;
processing the cross-polarized signal component to obtain a vector of digital sample values for the cross-polarized signal component;
cross correlating the vector for the co-polarized signal component with the vector for the cross-polarized signal component and using results of the cross correlating to obtain a peak signal-to-noise ratio;
determining a correlation gain based on a number of digital sample values used to perform the correlating; and
determining cross-polarization isolation based on a difference between the correlation gain and the peak signal-to-noise ratio.

\* \* \* \* \*